US006319575B1

(12) United States Patent
Takashima et al.

(10) Patent No.: US 6,319,575 B1
(45) Date of Patent: Nov. 20, 2001

(54) POLYESTER RESIN COMPOSITION

(75) Inventors: Masahiko Takashima; Koji Yamamoto, both of Kanagawa-ken; Hisashi Shimazaki, Chiba-ken, all of (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 09/552,573

(22) Filed: Apr. 19, 2000

(30) Foreign Application Priority Data

Apr. 19, 1999 (JP) .................................................. 11-111048

(51) Int. Cl.⁷ .............................. B01J 15/00; C08L 67/02
(52) U.S. Cl. ........................................... 428/35.7; 525/425
(58) Field of Search ............................. 525/425; 428/35.7

(56) References Cited

U.S. PATENT DOCUMENTS

| 5,258,233 | 11/1993 | Mills et al. ........................... 428/480 |
| 5,340,884 | * 8/1994 | Mills et al. ........................... 125/420 |

FOREIGN PATENT DOCUMENTS

| 1-272660 | 10/1989 | (JP) . |
| 6-2871 | 1/1994 | (JP) . |

OTHER PUBLICATIONS

Patent Abstracts of Japan, Publication No.: 58160344, Publication Date: Sep. 22, 1983.
Patent Abstracts of Japan, Publication No.: 05008283, Publication Date: Jan. 19, 1993.
Patent Abstracts of Japan, Publication No.: 05295241, Publication Date: Nov. 9, 1993.

* cited by examiner

*Primary Examiner*—Ana Woodward
(74) *Attorney, Agent, or Firm*—Antonelli, Terry, Stout & Kraus, LLP

(57) ABSTRACT

A polyester resin composition is produced by melt-kneading a mixture comprising a polyamide resin and a polyester resin, and a tricarboxylic acid compound. The polyamide resin is a polymerization product of a diamine component containing 70 mol % or more of m-xylylenediamine and a dicarboxylic acid component containing 70 mol % or more of adipic acid. The polyester resin is a polymerization product of a dicarboxylic acid component containing 70 mol % or more of an aromatic dicarboxylic acid and a diol component containing 70 mol % or more of an aliphatic diol. The incorporation of a tricarboxylic acid compound such as aromatic tricarboxylic acids and their anhydrides improves transparency and whitening resistance at moisture absorbing of films, sheets and thin-wall hollow containers without deteriorating their gas barrier properties.

23 Claims, No Drawings

POLYESTER RESIN COMPOSITION

BACKGROUND OF THE INVENTION

The present invention relates to a polyester resin composition having excellent transparency, gas-barrier property and whitening resistance upon absorbing moisture, which comprises, as main components, a polyamide resin produced from a diamine component containing 70 mol % or more of m-xylylenediamine and a dicarboxylic acid component containing 70 mol % or more of adipic acid, and a polyester resin produced from a dicarboxylic acid component containing 70 mol % or more of an aromatic dicarboxylic acid and a diol component containing 70 mol % or more of an aliphatic diol. The present invention further relates to films, sheets and thin-wall hollow containers produced by molding the polyester resin composition.

Polyester resins produced from a dicarboxylic acid component composed mainly of an aromatic dicarboxylic acid and a diol component composed mainly of an aliphatic diol (hereinafter may be referred to as "aromatic polyester resin"), typically exemplified by polyethylene terephthalate, have been extensively used as packaging or wrapping materials such as films, sheets and hollow containers due to their excellent mechanical properties, melt stability, solvent resistance, fragrance retention and recyclability. However, since the gas-barrier property against oxygen, carbon dioxide, etc. is not necessarily sufficient, the use of known aromatic polyester resins in applications requiring a high gas-barrier property is limited. To improve the gas-barrier property of the known aromatic polyester resins, there have been proposed a method of laminating foils of metals such as aluminum, a method of coating or laminating another resin film having a high gas-barrier property and a method of depositing aluminum or silicon. However, these proposed methods involve disadvantages such as deterioration in transparency, need for complicated production process, deterioration in mechanical properties, etc.

To achieve high gas-barrier property without needing complicated production process, there has been proposed a method of simply blending the polyester resins with another resin having a high gas-barrier property. Polyamide resins such as nylon 6 and nylon 66, especially those produced by polymerization of m-xylylenediamine and adipic acid (hereinafter may be referred to as "polyamide MXD6") are known as high gas-barrier resins. Gas-barrier resins other than polyamide resins include ethylene-vinyl alcohol copolymer resins. However, an aromatic polyester resin composition blended with ethylene-vinyl alcohol copolymer resin has various disadvantages such as whitening due to its poor compatibility with the aromatic polyester resin, poor stretchability due to its high crystallizability, low heat stability, etc.

Polyamide MXD6 has a high gas-barrier property as well as an excellent heat stability at melting, and the glass transition temperature, melting point and crystallinity thereof are close to those of the aromatic polyester resins, especially polyethylene terephthalate. Therefore, polyamide MXD6 is advantageous because it is easily compatible with the aromatic polyester resins by melt mixing, it does not deteriorate mechanical properties and stretchability of the aromatic polyester resins, and it exhibits a high gas-barrier property. However, the use of a composition of aromatic polyester resin and polyamide resin such as polyamide MXD6 in applications requiring a high transparency is limited due to its insufficient transparency. In addition, a composition of aromatic polyester resin and polyamide MXD6 is likely to cause whitening when exposed to high-humidity atmosphere or contacted with water in amorphous non- or low-stretched conditions.

Japanese Patent Application Laid-Open No. 1-272660 discloses a composition comprising a mixture of polyamide resin and polyester resin blended with tetracarboxylic dianhydride. The proposed resin composition is different from the polyester resin composition of the present invention in their chemical compositions. Although the proposed composition is taught to improve mechanical properties of molded products usable as engineering plastics, the prior art is quite silent as to a resin composition suitable for the production of films, sheets and hollow containers having high transparency.

Japanese Patent Publication No. 6-2871 proposes the use a compound having epoxy group and acid anhydride group, which is quite different from the tricarboxylic acid and its anhydride used in the present invention, to compatibilize a thermoplastic polyester resin with a polyamide resin containing m-xylylene group in the main polymer chain.

SUMMARY OF THE INVENTION

It is an object of the present invention to provide a polyester resin composition comprising an aromatic polyester resin and a polyamide resin which is suitable for the production of films, sheets and thin-wall hollow containers exhibiting a high gas-barrier property and an excellent transparency, thereby solving the above problems.

It is another object of the present invention to provide a polyester resin composition suitable for production of highly transparent, high gas-barrier films, sheets and thin-wall hollow containers well resistant to whitening when exposed to high-humidity atmosphere or contacted with water in amorphous non- or low-stretched conditions.

It is still another object of the present invention to provide a molded product made of the above polyester composition.

As a result of extensive study in view of the above objects, the inventors have found that a resin composition suitable for the production of films, sheets and thin-wall hollow containers exhibiting a high gas-barrier property and an excellent transparency is obtained by blending a tricarboxylic acid compound with a mixture of an aromatic polyester resin and a polyamide resin. It has been further found that such a composition is also suitable for the production of films, sheets and thin-wall hollow containers having improved resistance to whitening upon absorbing moisture. The present invention has been accomplished based on these findings.

Thus, the present invention provides the following polyester resin compositions (I) and (II).

(I) A polyester resin composition produced by melt-kneading (1) 100 parts by weight of a mixture comprising 5 to 50% by weight of a polyamide resin produced by polymerization of a diamine component containing 70 mol % or more of m-xylylenediamine and a dicarboxylic acid component containing 70 mol % or more of adipic acid, and 95 to 50% by weight of a polyester resin (hereinafter may be referred to as "present polyester resin") produced by polymerization of a dicarboxylic acid component containing 70 mol % or more of an aromatic dicarboxylic acid and a diol component containing 70 mol % or more of an aliphatic diol; and (2) 0.01 to 2 parts by weight of a tricarboxylic acid compound.

(II) A polyester resin composition produced by melt-kneading (1) 95 to 50% by weight of a copolyester resin (hereinafter may be referred to as "present copolyester resin") produced by polymerization of an acid component and a diol component, the acid component comprising (A) 99.99 to 98.0 mol % of a dicarboxylic acid component containing 70 mol % or more of an aromatic dicarboxylic acid and (B) 0.01 to 2 mol % of a tricarboxylic acid compound, and the diol component comprising 70 mol % or more of an aliphatic diol; and (2) 5 to 50% by weight of a polyamide resin produced by polymerization of a diamine component containing 70 mol % or more of m-xylylenediamine and a dicarboxylic acid component containing 70 mol % or more of adipic acid.

The polyester resin composition according to the present invention is suitable for the production of films, sheets and thin-wall hollow containers. More specifically, the polyester resin composition is suitable for manufacturing packaging materials required to have a high transparency, such as non- or low-stretched single- or multi-layered sheets produced by T-die extrusion method or coextrusion method, stretched films made of such sheets, low-stretched deep-drawn containers, and thin-wall hollow containers having 0.1 to 2 mm-thick body portion which are produced by non-stretching extrusion blow molding and injection stretch blow molding.

DETAILED DESCRIPTION OF THE INVENTION

Examples of the aromatic dicarboxylic acids as a raw material of the present polyester resin include terephthalic acid, isophthalic acid, naphthalene dicarboxylic acids such as 2,6-naphthalenedicarboxylic acid, 1,5-naphthalenedicarboxylic acid and 2,7-naphthalenedicarboxylic acid, 4,4'-biphenyldicarboxylic acid, 3,4'-biphenyldicarboxylic acid, and ester-forming derivatives thereof. The present polyester resin may also contain an aliphatic dicarboxylic acid such as adipic acid, azelaic acid and sebacic acid or a monocarboxylic acid such as benzoic acid, propionic acid and butyric acid, unless the addition thereof adversely affects the objects of the present invention. The content of the aromatic dicarboxylic acid in the dicarboxylic acid component for the present polyester resin is 70 mol % or more, preferably 80 mol % or more, more preferably 90 mol % or more.

Examples of the aliphatic diols as a raw material of the present polyester resin include ethylene glycol, 1,3-propylene diol, 1,4-butane diol, 1,4-cyclohexane dimethanol, 1,6-hexane diol and ester-forming derivatives thereof. A part of the diol component may be substituted with a monohydric alcohol such as butyl alcohol, hexyl alcohol and octyl alcohol, and a polyhydric alcohol such as trimethylol propane, glycerol and pentaerythritol, unless the use thereof adversely affects the objects of the present invention. The content of the aliphatic diol in the diol component of the present polyester resin is 70 mol % or more, preferably 80 mol % or more, more preferably 90 mol % or more.

Examples of the polyester resins usable in the present invention include polyethylene terephthalate resin, ethylene terephthalate-isophthalate copolymer resin, ethylene-1,4-cyclohexanedimethylene terephthalate copolymer resin, polyethylene 2,6-naphthalenedicarboxylate resin, ethylene 2,6-naphthalenedicarboxylate-terephthalate copolymer resin, ethylene terephthalate-4,4'-biphenyldicarboxylate copolymer resin, poly-1,3-propylene terephthalate resin, polybutylene terephthalate resin and polybutylene 2,6-naphthalenedicarboxylate resin. Preferred are polyethylene terephthalate resin and ethylene terephthalate-isophthalate copolymer resin.

The moisture content of the present polyester resin is preferably 200 ppm or less, more preferably 100 ppm or less. The intrinsic viscosity is preferably 0.3 to 2.0 dl/g, more preferably 0.4 to 1.8 dl/g when measured at 25° C. in 60/40 (by weight) phenol/1,1,2,2-tetrachloroethane mixed solution, although not particularly limited thereto. Since polyester resins having an intrinsic viscosity of 0.3 dl/g or more have a sufficiently high molecular weight, molded articles made of a polyester resin composition containing such a polyester resin are satisfactory in mechanical properties.

The polyamide resin usable in the present invention is produced by polymerizing the diamine component with the dicarboxylic acid component. The diamine component is required to contain m-xylylenediamine in an amount of 70 mol % or more so as to ensure prolonged excellent gas-barrier property of a final polyester resin composition. Examples of diamines other than m-xylylenediamine usable in the present invention include p-xylylenediamine, 1,3-bis(aminomethyl)cyclohexane, 1,4-bis(aminomethyl)cyclohexane, tetramethylenediamine, hexamethylenediamine, nonamethylenediamine and 2-methyl-1,5-pentanediamine, although not particularly limited thereto.

The dicarboxylic acid component for the polyamide resin is required to contain adipic acid in an amount of 70 mol % or more so as to prevent a final polyester resin composition from being deteriorated in gas-barrier property and being excessively reduced in crystallizability. Examples of usable dicarboxylic acid components other than adipic acid include suberic acid, azelaic acid, sebacic acid, 1,10-decanedicarboxylic acid, terephthalic acid, isophthalic acid and 2,6-naphthalenedicarboxylic acid, although not particularly limited thereto. Further, a monoamine or monocarboxylic acid may be used as a molecular weight modifier in the production of the present polyamide resin.

The polyamide resin usable in the present invention may be produced by melt-polycondensing the diamine component with the dicarboxylic acid component. For instance, a nylon salt of m-xylylenediamine and adipic acid is heated under pressure in the presence of water, thereby initiating melt-polymerization while removing water and generated water from the reaction system. Alternatively, m-xylylenediamine may be directly added to molten adipic acid to carry out polycondensation under ordinary pressure. To keep the reaction system in homogeneous liquid state, the polycondensation is allowed to proceed while continuously adding m-xylylenediamine to molten adipic acid and heating the reaction system so as to prevent the reaction temperature from falling to temperatures lower than the melting point of oligoamide or polyamide being produced.

The relative viscosity of the polyamide resin is 1.83 to 4.20, preferably 2.02 to 4.20, and more preferably 2.30 to 4.20 when measured at 25° C. on a solution of 1 g polyamide resin in 100 ml of 96% sulfuric acid. When the relative viscosity is 1.80 or lower, the resultant polyester composition is difficult to be molded into films, sheets or hollow containers due to significant die swelling or uneven melt attributable to unstable fluidity of molten resin composition. A polyamide resin having a relative viscosity of 1.83 or higher improves the moldability of the polyester resin composition into films, sheets and hollow containers. In addition, molded articles made of such a polyester composition are improved in transparency and prevented from being deteriorated in transparency due to whitening under high-humidity conditions.

The polyamide resin having a relative viscosity of 2.30 or higher can be easily produced by continuing the melt-polymerization reaction until the relative viscosity reaches the aimed value. However, such a continued melt-polymerization requires a prolonged period of time (reaction time) for maintaining the molten state of reaction system, resulting in damage to polyamide molecules or formation of gels or fish eyes due to aberrant reactions such as crosslinked molecular growth, etc. Although a polyester resin composition incorporated with such a polyamide resin containing a large amount of gels or fish eyes gives molded articles which are improved in transparency to some extent, the productivity is expected to be reduced due to inclusion of fish eyes.

A polyamide resin having a relative viscosity of 2.30 or higher free from the above problems may be produced more preferably by solid phase-polymerizing a melt-polymerized polyamide having a relative viscosity of 2.28 or lower, thereby increasing the relative viscosity to 2.30 or higher. By terminating the melt polymerization before the relative viscosity exceeds 2.28, the generation of fish eyes due to increased heat history of the polyamide can be prevented. The solid phase polymerization is carried out by heating pellets or powder of melt-polymerized polyamide having a relative viscosity satisfying the following formula (1):

$$1.83 \leq \text{relative viscosity} \leq 2.28 \quad (1)$$

to a temperature within the range of 120° C. to the melting point of the polyamide resin under reduced pressure or in inert gas atmosphere. The solid phase-polymerized polyamide thus produced is preferred to have a relative viscosity satisfying the following formula (2):

$$2.30 \leq \text{relative viscosity} \leq 4.20 \quad (2).$$

A polyester resin composition incorporated with a solid phase-polymerized polyamide having a relative viscosity of 2.30 or higher exhibits a good moldability into films, sheets or hollow containers. Further, since the solid phase-polymerized polyamide resin is produced from a melt-polymerized polyamide containing less fish eyes, the generation of fish eyes in films, sheets or hollow containers are reduced, thereby remarkably increasing the productivity.

The polyamide resin is preferably a dried resin having a moisture content of 0.15% or less, preferably 0.1% or less. The polyamide resin may be dried by any of known methods, for example, a method where polyamide resin is melt-extruded from a vent extruder while reducing vent hole pressure to remove moisture in the polyamide resin, or a method where polyamide resin is heated in a tumbler (rotary vacuum tank) at temperatures not exceeding its melting point under reduced pressure, although not limited thereto.

The aromatic tricarboxylic acid compound is selected from the group consisting of aromatic tricarboxylic acids and their anhydrides. Examples thereof include trimellitic acid, trimellitic anhydride, hemimellitic acid, trimesic acid, naphthalenetricarboxylic anhydrides including position isomers, anthracenetricarboxylc acids including position isomers, anthracenetricarboxylic anhydrides including position isomers, biphenyldicarboxylic anhydrides including position isomers, benzophenonetricarboxylic anhydrides including position isomers and ethylene-bis-trimellitic anhydride. Of these tricarboxylic acid compounds, particularly preferred is trimellitic anhydride.

The polyester resin composition according to the present invention is produced by blending 100 parts by weight of a mixture composed of the polyamide resin and the polyester resin with 0.01 to 2 parts by weight, preferably 0.05 to 1.5 parts by weight, more preferably 0.1 to 1 part by weight of the tricarboxylic acid compound. The mixture comprises 5 to 50% by weight, preferably 5 to 45% by weight, more preferably 5 to 40% by weight of the polyamide resin and 95 to 50% by weight, preferably 95 to 55% by weight, more preferably 95 to 60% by weight of the polyester resin.

When the tricarboxylic acid compound is mixed in an amount of 0.01 part by weight or more, molded articles made of a resultant polyester resin composition is remarkably improved in transparency and prevented from being deteriorated in transparency due to whitening under high-humidity conditions. When the mixing amount of tricarboxylic acid compound is 2 parts by weight or less, molded articles made of a resultant polyester resin composition exhibits improved transparency as well as necessary mechanical properties.

Since the tricarboxylic acid compound used in the present invention hardly form crosslinked polymers as compared with using aromatic polycarboxylic acids having four or more carboxyl groups or their mono- or polyanhydrides, molded articles of improved quality can be produced from the polyester resin composition of the present invention.

It has been known that the transparency of molded articles made of a mixture of polyamide resin and polyester resin varies depending upon the melt viscosity ratio, (melt viscosity of polyester resin)/(melt viscosity of polyamide resin). The melt viscosity is measured at 275° C., for example, using a flow tester (CFT-500 Model manufactured by Shimadzu Corporation) having a die of 1 mm$\phi$×10 mm long operated at an extrusion pressure of 10 kgf/cm$^2$. However, the polyester resin composition of the present invention, which is obtained by blending a mixture of polyamide resin and polyester resin with the tricarboxylic acid compound, gives molded articles having improved transparency at any melt viscosity ratios.

The blending for producing the polyester resin compositions according to the present invention may be conducted by any known methods. For example, the polyamide resin, the polyester resin and the tricarboxylic acid compound may be dry-blended in tumbler, V-type blender or Henschel mixer. The resultant dry blend may be melt-mixed once or more by a single-screw extruder, a twin-screw extruder or a kneader. If desired, the mixture after melt-mixing may be subjected to solid phase polymerization under high-vacuum condition or in inert gas atmosphere.

The polyester resin composition according to the present invention may be produced by any of a method where the polyamide resin, the polyester resin and the tricarboxylic acid compound are melt-kneaded simultaneously; a method where the polyester resin and the tricarboxylic acid compound are melt-kneaded in advance and then the resultant mixture is melt-kneaded with the polyamide resin; or a method where the polyamide resin and the tricarboxylic acid compound are melt-kneaded in advance and then the resultant mixture is melt-kneaded with the polyester resin.

The effect of improving the transparency of the present invention is also achieved when the mixture is subjected to solid phase polymerization under high-vacuum condition or in inert gas atmosphere after the pre-kneading. The extrusion temperature in the melt-kneading is preferably 220 to 300° C., more preferably 240 to 290° C., and still more preferably 260 to 290° C.

Further, the effect of improving the transparency is achieved when a polyamide resin and a polyester resin are melt-kneaded with a master batch which is prepared by blending the tricarboxylic acid compound to a polyamide resin and/or a polyester resin.

Still further, the effect of improving the transparency is achieved by a polyester resin composition produced by melt-kneading a polyamide resin with a copolyester resin containing the tricarboxylic acid compound as a comonomer component.

The present copolyester resin is produced by copolymerization of a diol component and an acid component comprising a dicarboxylic acid component and a tricarboxylic acid compound. The dicarboxylic acid component is composed of 70 mol % or more, preferably 80 mol % or more, more preferably 90 mol % or more of an aromatic dicarboxylic acid such as terephthalic acid, isophthalic acid, naphthalene dicarboxylic acids such as 2,6-naphthalenedicarboxylic acid, 1,5-naphthalenedicarboxylic acid and 2,7-naphthalenedicarboxylic acid, 4,4'-biphenyldicarboxylic acid, 3,4'-biphenyldicarboxylic acid, and dialkyl esters thereof. The dialkyl esters may include dimethyl terephthalate, dimethyl isophthalate, dimethyl 2,6-naphthalenedicarboxylate, etc. The dicarboxylic acid component may also contain an aliphatic dicarboxylic acid such as adipic acid, azelaic acid and sebacic acid, unless the addition thereof adversely affects the objects of the present invention. Particularly preferred aromatic dicarboxylic acids are terephthalic acid and dimethyl terephthalate.

The same tricarboxylic acid compounds as mentioned above may be used as the comonomer for the present copolyester resin.

The diol component for the present copolyester resin is composed of 70 mol % or more, preferably 80 mol % or more, more preferably 90 mol % or more of an aliphatic diol such as ethylene glycol, 1,3-propylene diol, 1,4-butane diol, 1,4-cyclohexane dimethanol and 1,6-hexane diol. The diol component may contain a monohydric alcohol such as butyl alcohol, hexyl alcohol and octyl alcohol, and a polyhydric alcohol such as trimethylol propane, glycerol and pentaerythritol, unless the objects of the present invention is adversely affected.

The present copolyester resin may be produced by any of known methods such as direct esterification and ester interchange. For example, a dicarboxylic acid, a tricarboxylic acid compound and a diol are heated under pressure while removing generated water from the reaction system, thereby obtaining a polycondensation product with low molecular weight, which is then converted to a copolyester of high molecular weight by distilling off the diol from the reaction system under reduced pressure in the presence of a polycondensation catalyst such as germanium compounds and antimony compounds. Alternatively, a dialkyl ester of dicarboxylic acid, a tricarboxylic acid compound and a diol are heated under ordinary pressure while removing generated alkyl alcohol from the reaction system, thereby obtaining a polycondensation product with low molecular weight, which is then converted to a copolyester of high molecular weight by distilling off the diol from the reaction system under reduced pressure in the presence of a polycondensation catalyst such as germanium compounds and antimony compounds. In each of the production methods, the copolymerization is allowed to proceed by heating the reaction system so that the reaction temperature does not become lower than the melting point of oligomer or copolyester being produced, thereby keeping the reaction system in homogeneous liquid state. If still higher molecular weight is desired, the copolyester from melt-polycondensation may be solid phase-polymerized.

In the production of the present copolyester resin, the tricarboxylic acid compound is preferably added to the copolymerization system when the reaction rate of the dicarboxylic acid component reaches 75 to 98%. After the addition of the tricarboxylic acid compound, it is preferred to immediately distill off the diol from the reaction system. The reaction rate of the dicarboxylic acid component referred to in the present invention is calculated from the following formula (I):

$$\text{Reaction Rate } (\%) = (P/Q) \times 100 \qquad (I)$$

wherein P is the amount of water or alkyl alcohol generated by condensation reaction between the starting dicarboxylic acid component and the starting diol component or between the dialkyl ester of the starting dicarboxylic acid component and the starting diol component, and Q is the theoretical amount of water or alkyl alcohol to be generated when the functional groups of the starting dicarboxylic acid component or dialkyl ester thereof are completely reacted with the diol.

When the reaction rate of dicarboxylic acid component is 75% or more, formation of gels and fish eyes is effectively prevented, thereby further increasing the productivity of molded articles from the polyester resin composition.

The moisture content of the present copolyester resin is preferably 200 ppm or less, more preferably 100 ppm or less. The intrinsic viscosity is preferably 0.3 to 2.0 dl/g, more preferably 0.4 to 1.8 dl/g when measured at 25° C. in 60/40 (by weight) phenol/1,1,2,2-tetrachloroethane mixed solution, although not particularly limited thereto. Since the present copolyester resins having an intrinsic viscosity of 0.3 dl/g or more have a sufficiently high molecular weight, molded articles made of a polyester resin composition containing such a copolyester resin are satisfactory in mechanical properties.

In the production of the present copolyester resins, known esterification catalyst, ester interchange catalyst, etherification inhibitor, etc. may be used with or without another additive such as anti-oxidant, heat stabilizer, etc.

The polyester resin composition incorporated with the present copolyester resin is produced by melt-kneading a copolyester resin and a polyamide resin. The copolyester resin is produced by polymerization of an acid component and a diol component. The acid component comprises (A) 99.99 to 98.0 mol %, preferably 99.9 to 98.5 mol %, more preferably 99.8 to 99.0 mol % of a dicarboxylic acid component containing 70 mol % or more of an aromatic dicarboxylic acid and (B) 0.01 to 2 mol %, preferably 0.1 to 1.5 mol %, more preferably 0.2 to 1 mol % of a tricarboxylic acid compound, and the diol component comprises 70 mol % or more of an aliphatic diol. The same polyamide resin as mentioned above may be used. The extrusion temperature in the melt-kneading is preferably 220 to 300° C., more preferably 240 to 290° C., and still more preferably 260 to 290° C.

When the tricarboxylic acid compound is mixed in an amount of 0.01 mol % or more, molded articles made of a resultant polyester resin composition is remarkably improved in transparency and prevented from being deteriorated in transparency due to whitening under high-humidity conditions. When the mixing amount of tricarboxylic acid compound is 2 mol % or less, molded articles made of a resultant polyester resin composition exhibits improved transparency. In addition, since the present copolyester resin is free from the problems of formation of gels and fish eyes, the productivity of molded articles from the polyester resin composition is significantly improved.

The mixing ratio of the polyamide resin and the copolyester resin is 5 to 50% by weight, preferably 5 to 45% by weight, more preferably 5 to 40% by weight for the polyamide resin and 95 to 50% by weight, preferably 95 to 55% by weight, more preferably 95 to 60% by weight of for the copolyester resin, each based on the total weight of the polyester resin composition.

The polyester resin compositions according to the present invention may contain other resins and/or various additives unless the addition thereof adversely affects the effects of the present invention. Specific examples of the other resins include polyamides such as nylon 6 and nylon 66, polyolefins such as polyethylene and polypropylene, elastomers such as polyolefin elastomers and polyamide elastomers, and ionomers. Specific examples of the additives include pigments, dyes, lubricants, delustering agents, heat stabilizers, weathering agents, UV absorbers, nucleating agents, plasticizers, flame-retardants and antistatic agents.

Moreover, the polyester resin composition according to the present invention may contain salvaged polyester and/or polyamide resins such as salvaged materials of polyethylene terephthalate products, salvaged materials of modified-polyethylene terephthalate products containing a small amount of isophthalate units, salvaged materials of polyamide products, chips and flash generated during the molding, and salvaged materials of defective products, as long as the properties of the polyester resin composition is kept substantially unchanged.

The polyester resin compositions of the present invention obtained by blending a mixture of aromatic polyester resin and polyamide resin with the tricarboxylic acid compound exhibits a good moldability into non- or low-stretched single-layered or multi-layered sheets when produced by T-die extrusion method or coextrusion method, stretched films made of such sheets, low-stretched deep-drawn containers, extrusion blow-molded containers being kept non-stretched after molding, and injection stretch blow-molded containers. In addition, molded articles produced from the polyester resin composition such as films, sheets and thin-wall hollow containers show an excellent transparency and a good whitening resistance at moisture absorbing while maintaining a good gas-barrier property.

The present invention will be described in more detail by reference to the following examples. However, it should be noted that the following examples are illustrative and not intended to limit the invention thereto. In the examples and comparative examples, the characteristics and properties were evaluated by the following methods.

(1) Relative Viscosity

One gram of polyamide was precisely weighed and dissolved in 100 ml of 96% sulfuric acid under stirring at a temperature of 20 to 30° C. Immediately after complete dissolution, 5 cc of the solution was sampled into a Cannon-Fenske viscometer and allowed to stand in a 25° C. thermostat for 10 minutes. Then, the falling time (t) of the solution was measured. Similarly, the falling time ($t_0$) of 96% sulfuric acid was measured. The relative viscosity of the polyamide was calculated from the measured values t and $t_0$ according to the following formula (A):

$$\text{Relative viscosity} = t/t_0 \qquad (A).$$

(2) Moisture Content (wt. %)

The moisture content of resin was measured by heating the resin at its melting point for 30 minutes to vaporize water, using Karl-Fischer micro-moisture meter (CA-05 Model) and a vaporizer (VA-05 Model) both manufactured by Mitsubishi Chemical Corp.

(3) Haze

The haze value was measured according to JIS K7105 using a haze meter (Model: COH-300A) manufactured by Nippon Denshoku Kogyo Co., Ltd.

(4) Oxygen Permeability

The oxygen permeability was measured according to ASTM D3985. The measurement was carried out at 23° C. and 60% relative humidity using a permeability measuring device (Model: OX-TRAN10/50A) manufactured by Modern Controls Corp.

(5) Coefficient of Variation of Sheet Thickness

The thickness change of non-stretched sheet molded from a polyester resin composition was measured. Specifically, the thickness of sheet at a center of the transverse direction (width direction of sheet) was measured at 2 cm intervals for 50 points (measured length: 100 cm) along the machine direction (flow direction of sheet). The coefficient of variation of sheet thickness was calculated from the following formula (B):

$$\text{Coefficient of variation} = (\text{Standard deviation of thickness})/(\text{Average thickness}) \times 100 \qquad (B).$$

(6) Melt Viscosity Ratio

The measurement was carried out using a flow tester (Model: CFT-500) manufactured by Shimadzu Corporation under the following measuring conditions:

Die size: 1 mm$\phi$×10 mm long.

Extrusion pressure: 10 kgf/cm$^2$.

Measuring temperature: 275° C.

Using the measured values of melt viscosity at 275° C., the melt viscosity ratio was calculated from the following formula:

(melt viscosity of polyester)/(melt viscosity of polyamide).

EXAMPLES 1 TO 3

Into a 250-liter tumbler (rotary vacuum tank) equipped with a heating jacket for circulating heating medium, were charged at room temperature 100 kg of polyamide MXD6 pellets (relative viscosity: 1.85, moisture content: 0.62%) obtained by melt-polymerization of adipic acid and m-xylylenediamine. The heating medium was maintained at 130° C. until the polyamide MXD6 pellets were heated to above 120° C. and crystallized. Thereafter, the temperature of the heating medium was lowered to 125° C., thereby maintaining the pellets in the tank at 120° C. During the heating, the tank was evacuated to reduce the inner pressure to 0.5 to 10 Torr when the pellets exceeded 100° C., and thereafter, the heating of the pellets at 120° C. was continued for 270 minutes. After heating, the inner pressure of the tank was returned to ordinary pressure by introducing nitrogen gas thereinto, thereby starting the cooling of pellets. When the pellets were cooled to 90° C. or lower, the pellets were taken out of the tank. The obtained polyamide MXD6 had a relative viscosity of 1.87 and a moisture content of 0.03%.

Dry pellets of the obtained polyamide MXD6 (hereinafter may be referred to as "PA1") having a relative viscosity of 1.87 and a melt viscosity of 60 Pa·s and dry pellets of polyethylene terephthalate (available from Nippon Unipet Co., Ltd. under a trade name of Unipet RT543C, and hereinafter may be referred to as "PET1") having a melt viscosity of 360 Pa·s were blended at a blend ratio of PA1/PET1=20/80 (weight basis). In a tumbler, were mixed 100 parts by weight of the resin blend (melt viscosity ratio=6.0) and 0.1 to 0.3 part by weight of trimellitic anhydride (produced by Mitsubishi Gas Chemical Company, Inc. and hereinafter may be referred to as "TMA").

The resultant mixture was molded into film from a twin-screw extruder (screw diameter: 20 mm$\phi$; L/D: 25) by a T-die method under conditions of a cylinder temperature of 270 to 290° C., a T-die temperature of 280° C., a screw speed of 100 rpm and a cooling roll temperature of 70° C., thereby obtaining non-stretched sheet having a width of 120 mm and a thickness of about 0.3 mm. The haze values and the coefficient of thickness variation (for only sheet containing 0.2 part by weight of TMA) are shown in Table 1.

After preheating at 90 to 110° C. for 30 seconds, the non-stretched sheet was stretched simultaneously in the machine and transverse directions at a linear stretching speed of 89%/sec and a stretch ratio of 4.0 times the original length in each direction using a biaxial stretching machine manufactured by Toyo Seiki Co., Ltd. Then, the biaxially stretched film was heat-treated at 235 to 240° C. for 5 seconds under tension, thereby obtaining stretched film having a thickness of 20 μm. The haze value and the oxygen permeability of each film are shown in Table 1.

Comparative Example 1

Dry pellets of polyamide MXD6 (PA1) having a relative viscosity of 1.87 and dry pellets of polyethylene terephthalate (PET1) were blended at a blend ratio of PA1/PET1=20/80 (weight basis) to prepare a resin blend having a melt viscosity ratio of 6.0.

The resin blend was molded into film from a twin-screw extruder (screw diameter: 20 mmφ; L/D: 25) by a T-die method under conditions of a cylinder temperature of 270 to 290° C., a T-die temperature of 280° C., a screw speed of 100 rpm and a cooling roll temperature of 70° C., thereby obtaining non-stretched sheet having a width of 120 mm and a thickness of about 0.3 mm. The haze value of the sheet is shown in Table 1.

After preheating at 90 to 110° C. for 30 seconds, the non-stretched sheet was stretched simultaneously in the machine and transverse directions at a linear stretching speed of 89%/sec and a stretch ratio of 4.0 times in each direction using a biaxial stretching machine manufactured by Toyo Seiki Co., Ltd. Then, the biaxially stretched film was heat-treated at 235 to 240° C. for 5 seconds under tension, thereby obtaining stretched film having a thickness of 20 μm. The haze value and the oxygen permeability of the film are shown in Table 1.

TABLE 1

|  | Ex.1 | Ex.2 | Ex.3 | Com.Ex.1 |
|---|---|---|---|---|
| Resin Composition (wt. part) | | | | |
| Polyamide: PA1 | 20 | 20 | 20 | 20 |
| Polyester: PET1 | 80 | 80 | 80 | 80 |
| Melt viscosity ratio | 6.0 | 6.0 | 6.0 | 6.0 |
| Tricarboxylic acid compound | | | | |
| Kind | TMA | TMA | TMA | — |
| Content (wt. part)[a] | 0.1 | 0.2 | 0.3 | — |
| Evaluation results | | | | |
| Haze of non-stretched sheet (%)[b] | | | | |
| Ordinary conditioning | 6.7 | 5.2 | 4.3 | 10.3 |
| High-humidity storage | 14.0 | 14.5 | 7.2 | 23.7 |
| Haze of stretched film (%) | 5.8 | 4.7 | 4.4 | 7.8 |

TABLE 1-continued

|  | Ex.1 | Ex.2 | Ex.3 | Com.Ex.1 |
|---|---|---|---|---|
| Oxygen permeability[c] | 0.28 | 0.28 | 0.28 | 0.28 |
| Coefficient of thickness variation (%) | — | 6 | — | — |

[a]Weight part based on 100 parts by weight of a mixture of polyamide and polyester.
[b]Ordinary conditioning: measured after conditioned at 23° C. and 50% relative humidity for 48 hours; sheet thickness: 300 μm. High-humidity storage: measured after stored at 40° C. and 80% relative humidity for 5 days; sheet thickness: 300 μm.
[c]Unit: cc · mm/m$^2$ · day · atm.

Comparative Example 2

Into a 250-liter tumbler (rotary vacuum tank) equipped with a heating jacket for circulating heating medium, were charged at room temperature 100 kg of polyamide MXD6 pellets (relative viscosity: 1.72, moisture content: 0.68%) obtained by melt-polymerization of adipic acid and m-xylylenediamine. The heating medium was maintained at 130° C. until the polyamide MXD6 pellets were heated to above 120° C. and crystallized. Thereafter, the temperature of the heating medium was lowered to 125° C., thereby maintaining the pellets in the tank at 120° C. During the heating, the tank was evacuated to reduce the inner pressure to 0.5 to 10 Torr when the pellets exceeded 100° C., and thereafter, the heating of the pellets at 120° C. was continued for 270 minutes. After heating, the inner pressure of the tank was returned to ordinary pressure by introducing nitrogen gas thereinto, thereby starting the cooling of pellets. When the pellets were cooled to 90° C. or lower, the pellets were taken out of the tank. The obtained polyamide MXD6 had a relative viscosity of 1.75 and a moisture content of 0.03%.

Dry pellets of the obtained polyamide MXD6 (PA2) having a relative viscosity of 1.75 and dry pellets of polyethylene terephthalate (PET1) were blended at a blend ratio of PA2/PET1=20/80 (weight basis). In a tumbler, were mixed 100 parts by weight of the resin blend and 0.2 part by weight of pyromellitic dianhydride (produced by Mitsubishi Gas Chemical Company, Inc. and hereinafter may be referred to as "PMDA"). Although the resultant mixture was attempted to mold into film from a twin-screw extruder (screw diameter: 20 mmφ; L/D: 25) by a T-die method under conditions of a cylinder temperature of 270 to 290° C., a T-die temperature of 280° C., a screw speed of 100 rpm and a cooling roll temperature of 70° C., no film was obtained due to significant melt instability.

EXAMPLES 4 TO 6

Into a 250-liter tumbler (rotary vacuum tank) equipped with a heating jacket for circulating heating medium, were charged at room temperature 100 kg of polyamide MXD6 pellets (relative viscosity: 2.12, moisture content: 0.59%) obtained by melt-polymerization of adipic acid and m-xylylenediamine. The heating medium was maintained at 170° C. until the polyamide MXD6 pellets were heated to above 120° C. and crystallized. Thereafter, the temperature of the heating medium was lowered to 155° C., thereby maintaining the pellets in the tank at 150° C. During the heating, the tank was evacuated to reduce the inner pressure to 0.5 to 10 Torr when the pellets exceeded 140° C., and thereafter, the heating of the pellets at 150° C. was continued for 120 minutes. After heating, the inner pressure of the tank was returned to ordinary pressure by introducing nitrogen gas thereinto, thereby starting the cooling of pellets. When the pellets were cooled to 90° C. or lower, the pellets were taken out of the tank. The obtained polyamide MXD6 had a relative viscosity of 2.18 and a moisture content of 0.03%.

Dry pellets of the obtained polyamide MXD6 (hereinafter may be referred to as "PA3") having a relative viscosity of 2.18 and a melt viscosity of 200 Pa·s and dry pellets of polyethylene terephthalate (PET 1) were blended at a blend ratio of PA3/PET1=20/80 (weight basis). In a tumbler, were mixed 100 parts by weight of the resin blend (melt viscosity ratio=1.8) and 0.2 to 0.5 part by weight of TMA. The resultant mixture was molded into film from a twin-screw extruder (screw diameter: 20 mmφ; L/D: 25) by a T-die method under conditions of a cylinder temperature of 270 to 290° C., a T-die temperature of 280° C., a screw speed of 100 rpm and a cooling roll temperature of 70° C., thereby obtaining non-stretched sheet having a width of 120 mm and a thickness of about 0.3 mm. The haze value and the coefficient of thickness variation (or only sheet containing 0.2 part by weight of TMA) of each sheet are shown in Table 2. After preheating at 90 to 110° C. for 30 seconds, the non-stretched sheet was stretched simultaneously in the machine and transverse directions at a linear stretching speed of 89%/sec and a stretch ratio of 4.0 times the original length in each direction using a biaxial stretching machine manufactured by Toyo Seiki Co., Ltd. Then, the biaxially stretched film was heat-treated at 235 to 240° C. for 5 seconds under tension, thereby obtaining stretched film having a thickness of 20 μm. The haze value and the oxygen permeability of each film are shown in Table 2.

Comparative Example 3

Dry pellets of polyamide MXD6 (PA3) having a relative viscosity of 2.18 and dry pellets of polyethylene terephthalate (PET1) were blended at a blend ratio of PA3/PET1=20/80 (weight basis) to prepare a resin blend having a melt viscosity ratio of 1.8.

The resin blend was molded into film from a twin-screw extruder (screw diameter: 20 mmφ; L/D: 25) by a T-die method under conditions of a cylinder temperature of 270 to 290° C., a T-die temperature of 280° C., a screw speed of 100 rpm and a cooling roll temperature of 70° C., thereby obtaining non-stretched sheet having a width of 120 mm and a thickness of about 0.3 mm. The haze value of the sheet is shown in Table 2.

After preheating at 90 to 110° C. for 30 seconds, the non-stretched sheet was stretched simultaneously in the machine and transverse directions at a linear stretching speed of 89%/sec and a stretch ratio of 4.0 times in each direction using a biaxial stretching machine manufactured by Toyo Seiki Co., Ltd. Then, the biaxially stretched film was heat-treated at 235 to 240° C. for 5 seconds under tension, thereby obtaining stretched film having a thickness of 20 μm. The haze value and the oxygen permeability of the film are shown in Table 2.

TABLE 2

|  | Ex.4 | Ex.5 | Ex.6 | Com.Ex.3 |
|---|---|---|---|---|
| Resin Composition (wt. part) | | | | |
| Polyamide: PA3 | 20 | 20 | 20 | 20 |
| Polyester: PET1 | 80 | 80 | 80 | 80 |
| Melt viscosity ratio | 1.8 | 1.8 | 1.8 | 1.8 |
| Tricarboxylic acid compound | | | | |
| Kind | TMA | TMA | TMA | — |
| Content (wt. part)[a] | 0.2 | 0.3 | 0.5 | — |
| Evaluation results | | | | |

TABLE 2-continued

|  | Ex.4 | Ex.5 | Ex.6 | Com.Ex.3 |
|---|---|---|---|---|
| Haze of non-stretched sheet (%)[b] | | | | |
| Ordinary conditioning | 6.8 | 7.2 | 6.9 | 16.5 |
| High-humidity storage | 13.5 | 12.0 | 10.7 | 36.3 |
| Haze of stretched film (%) | 5.9 | 6.0 | 5.4 | 9.7 |
| Oxygen permeability[c] | 0.28 | 0.28 | 0.28 | 0.28 |
| Coefficient of thickness variation (%) | 5 | — | — | — |

[a] to [c]: Same as noted above.

EXAMPLE 7

Into a 250-liter tumbler (rotary vacuum tank) equipped with a heating jacket for circulating heating medium, were charged at room temperature 100 kg of polyamide MXD6 pellets (relative viscosity: 2.05, moisture content: 0.79%) obtained by melt-polymerization of adipic acid and m-xylylenediamine. The heating medium was maintained at 170° C. until the polyamide MXD6 pellets were heated to above 120° C. and crystallized. Thereafter, the temperature of the heating medium was raised to 225° C., thereby heating the pellets in the tank to 200° C. During the heating, the tank was evacuated to reduce the inner pressure to 0.5 to 10 Torr when the pellets exceeded 140° C., and thereafter, the heating of the pellets at 200° C. was continued for 20 minutes. After heating, the inner pressure of the tank was returned to ordinary pressure by introducing nitrogen gas thereinto, thereby starting the cooling of pellets. When the pellets were cooled to 90° C. or lower, the pellets were taken out of the tank. The obtained polyamide MXD6 had a relative viscosity of 2.60 and a moisture content of 0.03%.

The resultant solid phase-polymerized polyamide MXD6 (PA4) having a relative viscosity of 2.60 was extruded into film from a single-screw extruder (screw diameter: 20 mmφ; L/D: 25) by a T-die method under conditions of a cylinder temperature of 255 to 280° C., a T-die temperature of 275° C., a screw speed of 50 rpm and a cooling roll temperature of 70° C., thereby obtaining an non-stretched film having a width of 120 mm and a thickness of about 70 μm. The number of fish eyes having a diameter of 100 μm or larger in the film was 900 per m². It was confirmed that the solid phase-polymerized polyamide MXD6 having a relative viscosity of 2.60 was reduced in the number of fish eyes as compared to a melt-polymerized polyamide MXD6 having a relative viscosity of 2.59 obtained in Comparative Example 4.

Comparative Example 4

Into a 250-liter tumbler (rotary vacuum tank) equipped with a heating jacket for circulating heating medium, were charged at room temperature 100 kg of polyamide MXD6 pellets (relative viscosity: 2.57, moisture content: 0.73%) obtained by melt-polymerization of adipic acid and m-xylylenediamine. The heating medium was maintained at 130° C. until the polyamide MXD6 pellets were heated to above 120° C. and crystallized. Thereafter, the temperature of the heating medium was lowered to 125° C., thereby maintaining the pellets in the tank at 120° C. During the heating, the tank was evacuated to reduce the inner pressure to 0.5 to 10 Torr when the pellets exceeded 100° C., and thereafter, the heating of the pellets at 120° C. was continued for 300 minutes. After heating, the inner pressure of the tank was returned to ordinary pressure by introducing nitrogen gas thereinto, thereby starting the cooling of pellets. When the pellets were cooled to 90° C. or lower, the pellets were taken out of the tank. The obtained polyamide MXD6 had a relative viscosity of 2.59 and a moisture content of 0.03%.

The resultant dried melt-polymerized polyamide MXD6 (PA5) having a relative viscosity of 2.59 was extruded into film from a single-screw extruder (screw diameter: 20 mmϕ; L/D: 25) by a T-die method under conditions of a cylinder temperature of 255 to 280° C., a T-die temperature of 275° C., a screw speed of 50 rpm and a cooling roll temperature of 70° C., thereby obtaining an non-stretched film having a width of 120 mm and a thickness of about 70 μm. The number of fish eyes having a diameter of 100 μm or larger in the film was 3000 per m².

EXAMPLES 8 TO 10

Dry pellets of the obtained polyamide MXD6 (PA4) having a relative viscosity of 2.60 and a melt viscosity of 360 Pa·s and dry pellets of polyethylene terephthalate (PET1) were blended at a blend ratio of PA4/PET1=7/93 (weight basis). In a tumbler, were mixed 100 parts by weight of the resin blend (melt viscosity ratio=1.0) and 0.1 to 0.5 part by weight of TMA. The resultant mixture was molded into film from a twin-screw extruder (screw diameter: 20 mmϕ; L/D: 25) by a T-die method under conditions of a cylinder temperature of 270 to 290° C., a T-die temperature of 280° C., a screw speed of 100 rpm and a cooling roll temperature of 70° C., thereby obtaining non-stretched sheet having a width of 120 mm and a thickness of about 0.3 mm. The haze value of each sheet is shown in Table 3. After preheating at 90 to 110° C. for 30 seconds, the non-stretched sheet was stretched simultaneously in the machine and transverse directions at a linear stretching speed of 89%/sec and a stretch ratio of 4.0 times the original length in each direction using a biaxial stretching machine manufactured by Toyo Seiki Co., Ltd. Then, the biaxially stretched film was heat-treated at 235 to 240° C. for 5 seconds under tension, thereby obtaining stretched film having a thickness of 20 μm. The haze value and the oxygen permeability of each film are shown in Table 3.

Comparative Example 5

Dry pellets of polyamide MXD6 (PA4) and dry pellets of polyethylene terephthalate (PET1) were blended at a blend ratio of PA4/PET1=7/93 (weight basis) to prepare a resin blend having a melt viscosity ratio of 1.0.

The resin blend was molded into film from a twin-screw extruder (screw diameter: 20 mmϕ; L/D: 25) by a T-die method under conditions of a cylinder temperature of 270 to 290° C., a T-die temperature of 280° C., a screw speed of 100 rpm and a cooling roll temperature of 70° C., thereby obtaining non-stretched sheet having a width of 120 mm and a thickness of about 0.3 mm. The haze value of the sheet is shown in Table 3. After preheating at 90 to 110° C. for 30 seconds, the non-stretched sheet was stretched simultaneously in the machine and transverse directions at a linear stretching speed of 89%/sec and a stretch ratio of 4.0 times in each direction using a biaxial stretching machine manufactured by Toyo Seiki Co., Ltd. Then, the biaxially stretched film was heat-treated at 235 to 240° C. for 5 seconds under tension, thereby obtaining stretched film having a thickness of 20 μm. The haze value and the oxygen permeability of the film are shown in Table 3.

TABLE 3

| | Ex.8 | Ex.9 | Ex.10 | Com.Ex.5 |
|---|---|---|---|---|
| Resin Composition (wt. part) | | | | |
| Polyamide: PA4 | 7 | 7 | 7 | 7 |
| Polyester: PET1 | 93 | 93 | 93 | 93 |
| Melt viscosity ratio | 1.0 | 1.0 | 1.0 | 1.0 |
| Tricarboxylic acid compound | | | | |
| Kind | TMA | TMA | TMA | — |
| Content (wt. part)[a] | 0.1 | 0.2 | 0.5 | — |
| Evaluation results | | | | |
| Haze of non-stretched sheet (%)[b] | | | | |
| Ordinary conditioning | 4.9 | 4.7 | 5.1 | 9.1 |
| High-humidity storage | 6.8 | 6.5 | 6.9 | 18.2 |
| Haze of stretched film (%) | 5.6 | 5.5 | 5.7 | 7.0 |
| Oxygen permeability[c] | 0.94 | 0.94 | 0.94 | 0.94 |

[a] to [c]: Same as noted above.

EXAMPLES 11–17

Dry pellets of polyamide MXD6 (PA4) and dry pellets of polyethylene terephthalate (PET1) were blended at a blend ratio of PA4/PET1=20/80 (weight basis). In a tumbler, were mixed 100 parts by weight of the resin blend (melt viscosity ratio=1.0) and 0.1 to 1 part by weight of TMA. The resultant mixture was molded into film from a twin-screw extruder (screw diameter: 20 mmϕ; L/D: 25) by a T-die method under conditions of a cylinder temperature of 270 to 290° C., a T-die temperature of 280° C., a screw speed of 100 rpm and a cooling roll temperature of 70° C., thereby obtaining non-stretched sheet having a width of 120 mm and a thickness of about 0.3 mm. The haze value and the coefficient of thickness variation (or only sheet containing 0.2 part by weight of TMA) of each sheet are shown in Tables 4 and 5. After preheating at 90 to 110° C. for 30 seconds, the non-stretched sheet was stretched simultaneously in the machine and transverse directions at a linear stretching speed of 89%/sec and a stretch ratio of 4.0 times the original length in each direction using a biaxial stretching machine manufactured by Toyo Seiki Co., Ltd. Then, the biaxially stretched film was heat-treated at 235 to 240° C. for 5 seconds under tension, thereby obtaining stretched film having a thickness of 20 μm. The haze value and the oxygen permeability of each film are shown in Tables 4 and 5.

Comparative Example 6

Dry pellets of polyamide MXD6 (PA4) and dry pellets of polyethylene terephthalate (PET1) were blended at a blend ratio of PA4/PET1=20/80 (weight basis) to prepare a resin blend having a melt viscosity ratio of 1.0.

The resin blend was molded into film from a twin-screw extruder (screw diameter: 20 mmϕ; L/D: 25) by a T-die method under conditions of a cylinder temperature of 270 to 290° C., a T-die temperature of 280° C., a screw speed of 100 rpm and a cooling roll temperature of 70° C., thereby obtaining non-stretched sheet having a width of 120 mm and a thickness of about 0.3 mm. The haze value of the sheet is shown in Table 5.

After preheating at 90 to 110° C. for 30 seconds, the non-stretched sheet was stretched simultaneously in the machine and transverse directions at a linear stretching speed of 89%/sec and a stretch ratio of 4.0 times in each direction using a biaxial stretching machine manufactured by Toyo Seiki Co., Ltd. Then, the biaxially stretched film was heat-treated at 235 to 240° C. for 5 seconds under tension, thereby obtaining stretched film having a thickness of 20 μm. The haze value and the oxygen permeability of the film are shown in Table 5.

TABLE 4

|  | Ex.11 | Ex.12 | Ex.13 | Ex.14 |
|---|---|---|---|---|
| Resin Composition (wt. part) | | | | |
| Polyamide: PA4 | 20 | 20 | 20 | 20 |
| Polyester: PET1 | 80 | 80 | 80 | 80 |
| Melt viscosity ratio | 1.0 | 1.0 | 1.0 | 1.0 |
| Tricarboxylic acid compound | | | | |
| Kind | TMA | TMA | TMA | TMA |
| Content (wt. part)[a] | 0.1 | 0.2 | 0.3 | 0.5 |
| Evaluation results | | | | |
| Haze of non-stretched sheet (%)[b] | | | | |
| Ordinary conditioning | 12.3 | 8.6 | 9.2 | 9.0 |
| High-humidity storage | 22.1 | 17.2 | 16.1 | 10.8 |
| Haze of stretched film (%) | 6.9 | 6.3 | 5.9 | 6.6 |
| Oxygen permeability[c] | 0.28 | 0.28 | 0.27 | 0.24 |
| Coefficient of thickness variation (%) | — | 2 | — | — |

[a] to [c]: Same as noted above.

TABLE 5

|  | Ex.15 | Ex.16 | Ex.17 | Com.Ex.6 |
|---|---|---|---|---|
| Resin Composition (wt. part) | | | | |
| Polyamide: PA4 | 20 | 20 | 20 | 20 |
| Polyester: PET1 | 80 | 80 | 80 | 80 |
| Melt viscosity ratio | 1.0 | 1.0 | 1.0 | 1.0 |
| Tricarboxylic acid compound | | | | |
| Kind | TMA | TMA | TMA | — |
| Content (wt. part)[a] | 0.6 | 0.8 | 1.0 | — |
| Evaluation results | | | | |
| Haze of non-stretched sheet (%)[b] | | | | |
| Ordinary conditioning | 8.7 | 11.9 | 14.5 | 20.0 |
| High-humidity storage | 10.2 | 16.5 | 29.3 | 54.1 |
| Haze of stretched film (%) | 6.4 | 6.9 | 7.1 | 10.0 |
| Oxygen permeability[c] | 0.24 | 0.25 | 0.25 | 0.28 |

[a] to [c]: Same as noted above.

EXAMPLE 18

Into a 250-liter tumbler (rotary vacuum tank) equipped with a heating jacket for circulating heating medium, were charged at room temperature 100 kg of polyamide MXD6 pellets (relative viscosity: 2.20, moisture content: 0.83%) obtained by melt-polymerization of adipic acid and m-xylylenediamine. The heating medium was maintained at 170° C. until the polyamide MXD6 pellets were heated to above 120° C. and crystallized. Thereafter, the temperature of the heating medium was raised to 225° C., thereby elevating the pellet temperature to 200° C. During the heating, the tank was evacuated to reduce the inner pressure to 0.5 to 10 Torr when the pellets exceeded 140° C., and thereafter, the heating of the pellets was continued at 200° C. for 110 minutes. After heating, the inner pressure of the tank was returned to ordinary pressure by introducing nitrogen gas thereinto, thereby starting the cooling of pellets. When the pellets were cooled to 90° C. or lower, the pellets were taken out of the tank. The results of analysis on the resultant pellets showed that the solid phase-polymerized polyamide had a relative viscosity of 3.60 and a moisture content of 0.02%.

Dry pellets of the obtained polyamide MXD6 (PA6) having a relative viscosity of 3.60 and a melt viscosity of 2220 Pa·s and dry pellets of polyethylene terephthalate (PET1) were blended at a blend ratio of PA6/PET1=20/80 (weight basis). In a tumbler, were mixed 100 parts by weight of the resin blend (melt viscosity ratio=0.2) and 0.2 part by weight of TMA.

The resultant mixture was molded into film from a twin-screw extruder (screw diameter: 20 mmφ; L/D: 25) by a T-die method under conditions of a cylinder temperature of 270 to 290° C., a T-die temperature of 280° C., a screw speed of 100 rpm and a cooling roll temperature of 70° C., thereby obtaining non-stretched sheet having a width of 120 mm and a thickness of about 0.3 mm. The haze value and the coefficient of thickness variation are shown in Table 6. After preheating at 90 to 110° C. for 30 seconds, the non-stretched sheet was stretched simultaneously in the machine and transverse directions at a linear stretching speed of 89%/sec and a stretch ratio of 4.0 times the original length in each direction using a biaxial stretching machine manufactured by Toyo Seiki Co., Ltd. Then, the biaxially stretched film was heat-treated at 235 to 240° C. for 5 seconds under tension, thereby obtaining stretched film having a thickness of 20 μm. The haze value and the oxygen permeability of each film are shown in Table 6.

Comparative Example 7

Dry pellets of polyamide MXD6 (PA6) having a relative viscosity of 3.60 and dry pellets of polyethylene terephthalate (PET1) were blended at a blend ratio of PA6/PET1=20/80 (weight basis) to prepare a resin blend having a melt viscosity ratio of 0.2. The resin blend was molded into film from a twin-screw extruder (screw diameter: 20 mmφ; L/D: 25) by a T-die method under conditions of a cylinder temperature of 270 to 290° C., a T-die temperature of 280° C., a screw speed of 100 rpm and a cooling roll temperature of 70° C., thereby obtaining non-stretched sheet having a width of 120 mm and a thickness of about 0.3 mm. The haze value of the sheet is shown in Table 6. After preheating at 90 to 110° C. for 30 seconds, the non-stretched sheet was stretched simultaneously in the machine and transverse directions at a linear stretching speed of 89%/sec and a stretch ratio of 4.0 times in each direction using a biaxial stretching machine manufactured by Toyo Seiki Co., Ltd. Then, the biaxially stretched film was heat-treated at 235 to 240° C. for 5 seconds under tension, thereby obtaining stretched film having a thickness of 20 μm. The haze value and the oxygen permeability of the film are shown in Table 6.

TABLE 6

|  | Ex.18 | Com.Ex.7 |
|---|---|---|
| Resin Composition (wt. part) | | |
| Polyamide: PA6 | 20 | 20 |
| Polyester: PET1 | 80 | 80 |
| Melt viscosity ratio | 0.2 | 0.2 |
| Tricarboxylic acid compound | | |
| Kind | TMA | — |
| Content (wt. part)[a] | 0.2 | — |
| Evaluation results | | |
| Haze of non-stretched sheet (%)[b] | | |
| Ordinary conditioning | 12.5 | 22.3 |
| High-humidity storage | 23.1 | 51.6 |
| Haze of stretched film (%) | 6.4 | 7.8 |

TABLE 6-continued

|  | Ex.18 | Com.Ex.7 |
|---|---|---|
| Oxygen permeability[c] | 0.28 | 0.28 |
| Coefficient of thickness variation (%) | 1 | — |

[a] to [c]: Same as noted above.

EXAMPLE 19

Dry pellets of polyamide MXD6 (PA4) and dry pellets of polyethylene terephthalate (available from Nippon Unipet Co., Ltd. under a trade name of Unipet RT580CA, and hereinafter may be referred to as "PET2") having a melt viscosity of 2280 Pa·s were blended at a blend ratio of PA4/PET2=20/80 (weight basis). In a tumbler, were mixed 100 parts by weight of the resin blend (melt viscosity ratio=6.3) and 0.2 part by weight of TMA.

The resultant mixture was molded into film from a twin-screw extruder (screw diameter: 20 mmϕ; L/D: 25) by a T-die method under conditions of a cylinder temperature of 270 to 290° C., a T-die temperature of 280° C., a screw speed of 100 rpm and a cooling roll temperature of 70° C., thereby obtaining non-stretched sheet having a width of 120 mm and a thickness of about 0.3 mm. The haze value of the sheet is shown in Table 7. After preheating at 90 to 110° C. for 30 seconds, the non-stretched sheet was stretched simultaneously in the machine and transverse directions at a linear stretching speed of 89%/sec and a stretch ratio of 4.0 times the original length in each direction using a biaxial stretching machine manufactured by Toyo Seiki Co., Ltd. Then, the biaxially stretched film was heat-treated at 235 to 240° C. for 5 seconds under tension, thereby obtaining stretched film having a thickness of 20 μm. The haze value and the oxygen permeability of each film are shown in Table 7.

Comparative Example 8

Dry pellets of polyamide MXD6 (PA4) and dry pellets of polyethylene terephthalate (PET2) were blended at a blend ratio of PA4/PET2=20/80 (weight basis) to prepare a resin blend having a melt viscosity ratio of 6.3.

The resin blend was molded into film from a twin-screw extruder (screw diameter: 20 mmϕ; L/D: 25) by a T-die method under conditions of a cylinder temperature of 270 to 290° C., a T-die temperature of 280° C., a screw speed of 100 rpm and a cooling roll temperature of 70° C., thereby obtaining non-stretched sheet having a width of 120 mm and a thickness of about 0.3 mm. The haze value of the sheet is shown in Table 7. After preheating at 90 to 110° C. for 30 seconds, the non-stretched sheet was stretched simultaneously in the machine and transverse directions at a linear stretching speed of 89%/sec and a stretch ratio of 4.0 times in each direction using a biaxial stretching machine manufactured by Toyo Seiki Co., Ltd. Then, the biaxially stretched film was heat-treated at 235 to 240° C. for 5 seconds under tension, thereby obtaining stretched film having a thickness of 20 μm. The haze value and the oxygen permeability of the film are shown in Table 7.

TABLE 7

|  | Ex.19 | Com.Ex.8 |
|---|---|---|
| Resin Composition (wt. part) | | |
| Polyamide: PA4 | 20 | 20 |
| Polyester: PET2 | 80 | 80 |
| Melt viscosity ratio | 6.3 | 6.3 |

TABLE 7-continued

|  | Ex.19 | Com.Ex.8 |
|---|---|---|
| Tricarboxylic acid compound | | |
| Kind | TMA | — |
| Content (wt. part)[a] | 0.2 | — |
| Evaluation results | | |
| Haze of non-stretched sheet (%)[b] | | |
| Ordinary conditioning | 4.9 | 8.5 |
| High humidity storage | 6.1 | 18.6 |
| Haze of stretched film (%) | 4.9 | 7.8 |
| Oxygen permeability[c] | 0.23 | 0.23 |

[a] to [c]: Same as noted above.

EXAMPLES 20 TO 22

Dry pellets of polyamide MXD6 (PA4) and dry pellets of polyethylene terephthalate (PET1) were blended at a blend ratio of PA4/PET1=40/60 (weight basis). In a tumbler, were mixed 100 parts by weight of the resin blend (melt viscosity ratio=1.0) and 0.2 to 0.5 part by weight of TMA. The resultant mixture was molded into film from a twin-screw extruder (screw diameter: 20 mmϕ; L/D: 25) by a T-die method under conditions of a cylinder temperature of 270 to 290° C., a T-die temperature of 280° C., a screw speed of 100 rpm and a cooling roll temperature of 70° C., thereby obtaining non-stretched sheet having a width of 120 mm and a thickness of about 0.3 mm. The haze values of the sheets are shown in Table 8. After preheating at 90 to 110° C. for 30 seconds, the non-stretched sheet was stretched simultaneously in the machine and transverse directions at a linear stretching speed of 89%/sec and a stretch ratio of 4.0 times the original length in each direction using a biaxial stretching machine manufactured by Toyo Seiki Co., Ltd. Then, the biaxially stretched film was heat-treated at 235 to 240° C. for 5 seconds under tension, thereby obtaining stretched film having a thickness of 20 μm. The haze value and the oxygen permeability of each film are shown in Table 8.

Comparative Example 9

Dry pellets of polyamide MXD6 (PA4) and dry pellets of polyethylene terephthalate (PET1) were blended at a blend ratio of PA4/PET1=40/60 (weight basis) to prepare a resin blend having a melt viscosity ratio of 1.0.

The resin blend was molded into film from a twin-screw extruder (screw diameter: 20 mmϕ; L/D: 25) by a T-die method under conditions of a cylinder temperature of 270 to 290° C., a T-die temperature of 280° C., a screw speed of 100 rpm and a cooling roll temperature of 70° C., thereby obtaining non-stretched sheet having a width of 120 mm and a thickness of about 0.3 mm. The haze value of the sheet is shown in Table 8. After preheating at 90 to 110° C. for 30 seconds, the non-stretched sheet was stretched simultaneously in the machine and transverse directions at a linear stretching speed of 89%/sec and a stretch ratio of 4.0 times in each direction using a biaxial stretching machine manufactured by Toyo Seiki Co., Ltd. Then, the biaxially stretched film was heat-treated at 235 to 240° C. for 5 seconds under tension, thereby obtaining stretched film having a thickness of 20 μm. The haze value and the oxygen permeability of the film are shown in Table 8.

TABLE 8

|  | Ex.20 | Ex.21 | Ex.22 | Com.Ex.9 |
|---|---|---|---|---|
| Resin Composition (wt. part) | | | | |
| Polyamide: PA4 | 40 | 40 | 40 | 40 |
| Polyester: PET1 | 60 | 60 | 60 | 60 |
| Melt viscosity ratio | 1.0 | 1.0 | 1.0 | 1.0 |
| Tricarboxylic acid compound | | | | |
| Kind | TMA | TMA | TMA | — |
| Content (wt. part)[a] | 0.2 | 0.3 | 0.5 | — |
| Evaluation results | | | | |
| Haze of non-stretched sheet (%)[b] | | | | |
| Ordinary conditioning | 14.0 | 14.5 | 14.6 | 32.6 |
| High humidity storage | 28.3 | 27.5 | 18.9 | 75.0 |
| Haze of stretched film (%) | 6.9 | 6.8 | 7.2 | 10.7 |
| Oxygen permeability[c] | 0.12 | 0.12 | 0.12 | 0.12 |

[a] to [c]: Same as noted above.

Comparative Example 10

Dry pellets of polyamide MXD6 (PA4) and dry pellets of polyethylene terephthalate (PET1) were blended at a blend ratio of PA4/PET1=20/80 (weight basis). In a tumbler, were mixed 100 parts by weight of the resin blend (melt viscosity ratio=1.0) and 0.2 part by weight of maleic anhydride (produced by Mitsubishi Gas Chemical Company, Inc.). The resultant mixture was molded into film from a twin-screw extruder (screw diameter: 20 mmφ; L/D: 25) by a T-die method under conditions of a cylinder temperature of 270 to 280° C., a T-die temperature of 280° C., a screw speed of 100 rpm and a cooling roll temperature of 70° C., thereby obtaining non-stretched sheet having a width of 120 mm and a thickness of about 0.3 mm. The haze value of the sheet is shown in Table 9.

Comparative Example 11

Dry pellets of polyamide MXD6 (PA4) and dry pellets of polyethylene terephthalate (PET1) were blended at a blend ratio of PA4/PET1=20/80 (weight basis). In a tumbler, were mixed 100 parts by weight of the resin blend (melt viscosity ratio=1.0) and 0.5 part by weight of epoxidized soybean oil (available from Nippon Yushi Co., Ltd. under trade name of Newcizer 510R). The resultant mixture was molded into film from a twin-screw extruder (screw diameter: 20 mmφ; L/D: 25) by a T-die method under conditions of a cylinder temperature of 270 to 280° C., a T-die temperature of 280° C., a screw speed of 100 rpm and a cooling roll temperature of 70° C., thereby obtaining non-stretched sheet having a width of 120 mm and a thickness of about 0.3 mm. The haze value of the sheet is shown in Table 9.

Comparative Example 12

Dry pellets of polyamide MXD6 (PA4) and dry pellets of polyethylene terephthalate (PET1) were blended at a blend ratio of PA4/PET1=20/80 (weight basis). In a tumbler, were mixed 100 parts by weight of the resin blend (melt viscosity ratio=1.0) and 0.5 part by weight of epoxidized linseed oil (available from Nippon Yushi Co., Ltd. under trade name of Newcizer 512).

The resultant mixture was molded into film from a twin-screw extruder (screw diameter: 20 mmφ; L/D: 25) by a T-die method under conditions of a cylinder temperature of 270 to 280° C., a T-die temperature of 280° C., a screw speed of 100 rpm and a cooling roll temperature of 70° C., thereby obtaining non-stretched sheet having a width of 120 mm and a thickness of about 0.3 mm. The haze value of the sheet is shown in Table 9.

TABLE 9

|  | Com. Ex. 10 | Com. Ex. 11 | Com. Ex. 12 |
|---|---|---|---|
| Resin Composition (wt. part) | | | |
| Polyamide: PA4 | 20 | 20 | 20 |
| Polyester: PET1 | 80 | 80 | 80 |
| Melt viscosity ratio | 1.0 | 1.0 | 1.0 |
| Additives (wt. part)[a] | | | |
| Maleic anhydride | 0.2 | — | — |
| Epoxidized soybean oil | — | 0.5 | — |
| Epoxidized linseed oil | — | — | 0.5 |
| Evaluation results | | | |
| Haze of non-stretched sheet (%)[d] | 22.7 | 21.5 | 21.3 |

[a] Same as noted above.
[d] Measured after conditioned at 23° C. and 50% relative humidity for 48 hours; sheet thickness: 300 μm.

EXAMPLE 23

Dry pellets of polyamide MXD6 (PA4) and dry pellets of ethylene terephthalate-isophthalate copolymer resin (terephthalic acid unit/isophthalic acid unit=90/10 (by mol) available from Nippon Unipet Co., Ltd. under a trade name of Unipet RN163C, and hereinafter may be referred to as "PETI1") were blended at a blend ratio of PA4/PETI1=20/80 (weight basis). In a tumbler, were mixed 100 parts by weight of the resin blend and 0.3 part by weight of TMA. The resultant mixture was molded into film from a twin-screw extruder (screw diameter: 20 mmφ; L/D: 25) by a T-die method under conditions of a cylinder temperature of 270 to 290° C., a T-die temperature of 280° C., a screw speed of 100 rpm and a cooling roll temperature of 70° C., thereby obtaining non-stretched sheet having a width of 120 mm and a thickness of about 0.3 mm. The haze value of the sheet is shown in Table 10.

Comparative Example 13

Dry pellets of polyamide MXD6 (PA4) and dry pellets of ethylene terephthalate-isophthalate copolymer resin (PETI1) were blended at a blend ratio of PA4/PETI1=20/80 (weight basis) to prepare a resin blend.

The resin blend was molded into film from a twin-screw extruder (screw diameter: 20 mmφ; L/D: 25) by a T-die method under conditions of a cylinder temperature of 270 to 290° C., a T-die temperature of 280° C., a screw speed of 100 rpm and a cooling roll temperature of 70° C., thereby obtaining non-stretched sheet having a width of 120 mm and a thickness of about 0.3 mm. The haze value of the sheet is shown in Table 10.

TABLE 10

|  | Ex. 23 | Com. Ex. 13 |
|---|---|---|
| Resin Composition (wt. part) | | |
| Polyamide: PA4 | 20 | 20 |
| Polyester: PET11 | 80 | 80 |

TABLE 10-continued

|  | Ex. 23 | Com. Ex. 13 |
|---|---|---|
| Tricarboxylic acid compound | | |
| Kind | TMA | — |
| Content (wt. part)[a] | 0.3 | — |
| Evaluation results | | |
| Haze of non-stretched sheet (%)[d] | 6.3 | 12.2 |

[a] and [d]: Same as noted above.

EXAMPLES 24 TO 25

In a tumbler, 100 parts by weight of polyamide MXD6 (PA4) was mixed with 1.0 part by weight of TMA. The resultant mixture was melt-extruded from a twin-screw extruder (screw diameter: 20 mmφ; L/D: 25) at a cylinder temperature of 270 to 290° C., a strand die temperature of 280° C. and a screw speed of 100 rpm and then pelletized, thereby obtaining premix strand cut pellets (PA7).

Dried premix pellets (PA7) and dry pellets of polyethylene terephthalate (PET1) were blended at a blend ratio of PA7/PET1=20/80 to 40/60 (weight basis).

The mixture was molded into film from a twin-screw extruder (screw diameter: 20 mmφ; L/D: 25) by a T-die method under conditions of a cylinder temperature of 270 to 290° C., a T-die temperature of 280° C., a screw speed of 100 rpm and a cooling roll temperature of 70° C., thereby obtaining non-stretched sheet having a width of 120 mm and a thickness of about 0.3 mm. The haze value of each sheet is shown in Table 11. After preheating at 90 to 110° C. for 30 seconds, the non-stretched sheet was stretched simultaneously in the machine and transverse directions at a linear stretching speed of 89%/sec and a stretch ratio of 4.0 times in each direction using a biaxial stretching machine manufactured by Toyo Seiki Co., Ltd. Then, the biaxially stretched film was heat-treated at 235 to 240° C. for 5 seconds under tension, thereby obtaining stretched film having a thickness of 20 μm. The haze value and the oxygen permeability of each film are shown in Table 11.

EXAMPLES 26 TO 27

In a tumbler, 100 parts by weight of polyester resin (PET1) was mixed with 0.25 part by weight of TMA. The resultant mixture was melt-extruded from a twin-screw extruder (screw diameter: 20 mmφ; L/D: 25) at a cylinder temperature of 270 to 290° C., A strand die temperature of 280° C. and a screw speed of 100 rpm and then pelletized, thereby obtaining premix strand cut pellets (PET3).

Dried premix pellets (PET3) and dry pellets of polyamide MXD6 (PA4) were blended at a blend ratio of PA4/PET3= 20/80 to 40/60 (weight basis).

The mixture was molded into film from a twin-screw extruder (screw diameter: 20 mmφ; L/D: 25) by a T-die method under conditions of a cylinder temperature of 270 to 290° C., a T-die temperature of 280° C., a screw speed of 100 rpm and a cooling roll temperature of 70° C., thereby obtaining non-stretched sheet having a width of 120 mm and a thickness of about 0.3 mm. The haze values of the sheets are shown in Table 11. After preheating at 90 to 110° C. for 30 seconds, the non-stretched sheet was stretched simultaneously in the machine and transverse directions at a linear stretching speed of 89%/sec and a stretch ratio of 4.0 times in each direction using a biaxial stretching machine manufactured by Toyo Seiki Co., Ltd. Then, the biaxially stretched film was heat-treated at 235 to 240° C. for 5 seconds under tension, thereby obtaining stretched film having a thickness of 20 μm. The haze value and the oxygen permeability of each film are shown in Table 11.

TABLE 11

|  | Ex. 24 | Ex. 25 | Ex. 26 | Ex. 27 |
|---|---|---|---|---|
| Resin Composition (wt. part) | | | | |
| Polyamide: PA7 | 20 | 40 | — | — |
| Polyamide: PA4 | — | — | 20 | 40 |
| Polyester: PET1 | 80 | 60 | — | — |
| Polyester: PET3 | — | — | 80 | 60 |
| Tricarboxylic acid compound | | | | |
| Kind | TMA | TMA | TMA | TMA |
| Content (wt. part)[a] | 0.20 | 0.40 | 0.20 | 0.15 |
| Evaluation results | | | | |
| Haze of non-stretched sheet (%)[b] | | | | |
| Ordinary conditioning | 10.4 | 22.6 | 6.5 | 11.5 |
| High-humidity storage | 19.6 | 39.0 | 7.1 | 13.1 |
| Haze of stretched film (%) | 6.3 | 8.9 | 4.6 | 6.5 |
| Oxygen permeability[c] | 0.28 | 0.12 | 0.27 | 0.12 |

[a] to [c]: Same as noted above.

Comparative Examples 14 to 15

In a tumbler, dried pellets of polyamide MXD6 (PA4) and dried pellets of polyethylene terephthalate (PET1) were blended at a blend ratio of PA4/PET1=20/80 to 40/60 (weight basis).

The mixture was molded into film from a twin-screw extruder (screw diameter: 20 mmφ; L/D: 25) by a T-die method under conditions of a cylinder temperature of 270 to 290° C., a T-die temperature of 280° C., a screw speed of 100 rpm and a cooling roll temperature of 70° C., thereby obtaining non-stretched sheet having a width of 120 mm and a thickness of about 0.3 mm. The haze values of the sheets are shown in Table 12.

After preheating at 90 to 110° C. for 30 seconds, the non-stretched sheet was stretched simultaneously in the machine and transverse directions at a linear stretching speed of 89%/sec and a stretch ratio of 4.0 times in each direction using a biaxial stretching machine manufactured by Toyo Seiki Co., Ltd. Then, the biaxially stretched film was heat-treated at 235 to 240° C. for 5 seconds under tension, thereby obtaining stretched film having a thickness of 20 μm. The haze value and the oxygen permeability of each film are shown in Table 12.

TABLE 12

|  | Com. Ex. 14 | Com. Ex. 15 |
|---|---|---|
| Resin Composition (wt. part) | | |
| Polyamide: PA4 | 20 | 40 |
| Polyester: PET1 | 80 | 60 |
| Tricarboxylic acid compound | | |
| Kind | — | — |
| Content (wt. part)[a] | — | — |
| Evaluation results | | |
| Haze of non-stretched sheet (%)[b] | | |
| Ordinary conditioning | 20.2 | 32.6 |
| High-humidity storage | 54.1 | 75.0 |

TABLE 12-continued

|  | Com. Ex. 14 | Com. Ex. 15 |
|---|---|---|
| Haze of stretched film (%) | 10.0 | 10.7 |
| Oxygen permeability[e)] | 0.28 | 0.12 |

[a)] to [e)]: Same as noted above.

EXAMPLES 28 TO 31

Dry pellets of polyamide MXD6 (PA4) and dry pellets of polyethylene terephthalate (PET1) were blended at a blend ratio of PA4/PET1=20/80 (weight basis). In a tumbler, were mixed 100 parts by weight of the resin blend (melt viscosity ratio=1.0) and 0.2 to 0.8 part by weight of TMA. The resultant mixture was injection-molded into parison having a length of 110 mm, a wall thickness of 4.5 mm and an outer diameter of 26.5 mm by an injection molding apparatus at a cylinder temperature of 265 to 290° C., a hot runner temperature of 275° C. and a mold cooling water temperature of 10° C. The parisons were heated to 95 to 101° C. by an infrared heater, and then blow-molded under biaxial stretching into bottle having an overall length of 200 mm, a body diameter of 75 mm and an inner volume of 600 ml. The haze values of body portions of the bottles are shown in Table 13.

Comparative Example 16

Dry pellets of polyamide MXD6 (PA4) and dry pellets of polyethylene terephthalate (PET1) were blended at a blend ratio of PA4/PET1=20/80 (weight basis) to prepare a resin blend having a melt viscosity ratio of 1.0. The resin blend was injection-molded into parison having a length of 110 mm, a wall thickness of 4.5 mm and an outer diameter of 26.5 mm by an injection molding apparatus at a cylinder temperature of 265 to 290° C., a hot runner temperature of 275° C. and a mold cooling water temperature of 10° C. The parisons were heated to 95 to 100° C. by an infrared heater, and then blow-molded under biaxial stretching into bottle having an overall length of 200 mm, a body diameter of 75 mm and an inner volume of 600 ml. The haze values of body portions of the bottles are shown in Table 13.

TABLE 13

|  | Ex. 28 | Ex. 29 | Ex. 30 | Ex. 31 | Com. Ex. 16 |
|---|---|---|---|---|---|
| Resin Composition (wt. part) |  |  |  |  |  |
| Polyamide: PA4 | 20 | 20 | 20 | 20 | 20 |
| Polyester: PET1 | 80 | 80 | 80 | 80 | 80 |
| Melt viscosity ratio | 1.0 | 1.0 | 1.0 | 1.0 | 1.0 |
| Tricarboxylic acid compound |  |  |  |  |  |
| Kind | TMA | TMA | TMA | TMA | — |
| Content (wt. part)[a)] | 0.2 | 0.4 | 0.6 | 0.8 | — |
| Evaluation results |  |  |  |  |  |
| Haze of bottle body (%)[e)] | 24.5 | 20.9 | 17.4 | 17.2 | 32.7 |

[a)]Same as noted above.
[e)]Measured after conditioning the molded bottle at 23° C. and 50% relative humidity for 48 hours; body wall thickness: 300 μm.

EXAMPLES 32 TO 34

Dry pellets of polyamide MXD6 (PA4) and dry pellets of polyethylene terephthalate (PET2) were blended at a blend ratio of PA4/PET2=20/80 (weight basis). In a tumbler, were mixed 100 parts by weight of the resin blend (melt viscosity ratio=6.3) and 0.2 to 0.8 part by weight of TMA. The resultant mixture was injection-molded into parison having a length of 110 mm, a wall thickness of 4.5 mm and an outer diameter of 26.5 mm by an injection molding apparatus at a cylinder temperature of 270 to 290° C., a hot runner temperature of 285° C. and a mold cooling water temperature of 10° C. The parisons were heated to 100 to 106° C. by an infrared heater, and then blow-molded under biaxial stretching into bottle having an overall length of 200 mm, a body diameter of 75 mm and an inner volume of 600 ml. The haze values of body portions of the bottles are shown in Table 14.

Comparative Example 17

Dry pellets of polyamide MXD6 (PA4) and dry pellets of polyethylene terephthalate (PET2) were blended at a blend ratio of PA4/PET2=20/80 (weight basis) to prepare a resin blend having a melt viscosity ratio of 6.3. The resin blend was injection-molded into parison having a length of 110 mm, a wall thickness of 4.5 mm and an outer diameter of 26.5 mm by an injection molding apparatus at a cylinder temperature of 270 to 290° C., a hot runner temperature of 285° C. and a mold cooling water temperature of 10° C. The parisons were heated to 100 to 106° C. by an infrared heater, and then blow-molded under biaxial stretching into bottle having an overall length of 200 mm, a body diameter of 75 mm and an inner volume of 600 ml. The haze value of body portion of the bottle is shown in Table 14.

TABLE 14

|  | Ex. 32 | Ex. 33 | Ex. 34 | Com. Ex. 17 |
|---|---|---|---|---|
| Resin Composition (wt. part) |  |  |  |  |
| Polyamide: PA4 | 20 | 20 | 20 | 20 |
| Polyester: PET2 | 80 | 80 | 80 | 80 |
| Melt viscosity ratio | 6.3 | 6.3 | 6.3 | 6.3 |
| Tricarboxylic acid compound |  |  |  |  |
| Kind | TMA | TMA | TMA | — |
| Content (wt. part)[a)] | 0.2 | 0.6 | 0.8 | — |
| Evaluation results |  |  |  |  |
| Haze of bottle body (%)[e)] | 10.1 | 8.2 | 9.5 | 15.0 |

[a)] and [e)]: Same as noted above.

EXAMPLES 35 TO 37

Dry pellets of polyamide MXD6 (PA4) and dry pellets of polyethylene terephthalate (PET1) were blended at a blend ratio of PA4/PET1=20/80 (weight basis). In a tumbler, were mixed 100 parts by weight of the resin blend (melt viscosity ratio=1.0) and 0.1 to 0.5 part by weight of TMA. The resultant mixture was molded into film from a single-screw extruder (screw diameter: 40 mmφ; L/D: 25) by a T-die method under conditions of a cylinder temperature of 270 to 287° C., a T-die temperature of 280° C., a screw speed of 30 rpm and a cooling roll temperature of 70° C., thereby obtaining non-stretched sheet having a width of 300 mm and a thickness of about 0.3 mm.

The non-stretched sheets were heated to 100 to 110° C. by an infrared heater, and then subjected to air-pressure vacuum molding at an area draw ratio of 2.0 times using an air-pressure vacuum forming machine manufactured by Asano Kenkyusho Co., Ltd., thereby obtain a tray having a length of 155 mm, a width of 95 mm, a depth of 30 mm and a capacity of about 310 cc. The haze vale of bottom portion of each tray is shown in Table 15.

Comparative Example 18

Dry pellets of polyamide MXD6 (PA4) and dry pellets of polyethylene terephthalate (PET1) were blended in a tumbler at a blend ratio of PA4/PET1=20/80 (weight basis) to prepare a mixture. The resultant mixture was molded into film from a single-screw extruder (screw diameter: 40 mmφ; L/D: 25) by a T-die method under conditions of a cylinder temperature of 270 to 287° C., a T-die temperature of 280° C., a screw speed of 30 rpm and a cooling roll temperature of 70° C., thereby obtaining non-stretched sheet having a width of 300 mm and a thickness of about 0.3 mm. The non-stretched sheets were heated to 100 to 110° C. by an infrared beater, and then subjected to air-pressure vacuum molding at an area draw ratio of 2.0 times using an air-pressure vacuum forming machine manufactured by Asano Kenkyusho Co., Ltd., thereby obtain a tray having a length of 155 mm, a width of 95 mm, a depth of 30 mm and a capacity of about 310 cc. The haze vale of bottom portion of the tray is shown in Table 15.

TABLE 15

|  | Ex. 35 | Ex. 36 | Ex. 37 | Com. Ex. 18 |
|---|---|---|---|---|
| Resin Composition (wt. part) |  |  |  |  |
| Polyamide: PA4 | 20 | 20 | 20 | 20 |
| Polyester: PET1 | 80 | 80 | 80 | 80 |
| Tricarboxylic acid compound |  |  |  |  |
| Kind | TMA | TMA | TMA | — |
| Content (wt. part)[a] | 0.1 | 0.2 | 0.5 | — |
| Evaluation results |  |  |  |  |
| Haze of tray bottom (%)[f] | 15.1 | 12.2 | 13.4 | 21.9 |

[a]Same as noted above.
[f]Measured after conditioning the tray at 23° C. and 50% relative humidity for 48 hours; tray bottom thickness: 220 μm.

EXAMPLE 38

Into a reaction vessel equipped with a stirring device, a partial condenser, a thermometer and a nitrogen gas inlet, were charged 60.50 kg of dimethyl terephthalate, 34.88 kg of ethylene glycol and 23 g of manganese acetate. After sufficiently replacing the atmosphere with nitrogen gas, the contents Of the reaction vessel were heated to 159° C. over 109 minutes with stirring under gentle nitrogen gas stream. The supply of nitrogen gas was stopped when methanol generated by ester interchange begun to be distilled, and then the temperature of reaction mixture was raised continuously from 159° C. to 213° C. over 254 minutes, thereby distilling off the generated methanol through the partial condenser and cooling condenser while preventing ethylene glycol from being distilled off. When the amount of distilled methanol reached 19.09 kg (corresponding to 95.4% reaction rate of the dicarboxylic acid component), 0.18 kg of trimellitic anhydride (dimethyl terephthalate: trimellitic anhydride=99.7: 0.3 by mol), 9 g of germanium oxide and 48 g of triphenyl phosphite were charged into the reaction vessel, thereby initiating polycondensation. After continuously raising the temperature of reaction mixture from 210° C. to 243° C. over 35 minutes, the temperature was continuously raised to 282° C. over 142 minutes while gradually reducing the inner pressure to 0.27 kPa, thereby distilling off ethylene glycol from the reaction system. After continuing the polycondensation accompanying the distillation of ethylene glycol for 35 minutes while maintaining the reaction mixture at 282° C. and the inner pressure at 0.27 kPa or lower, the resultant copolyester resin was taken out of the reaction vessel and pelletized. The intrinsic viscosity of the copolyester was 0.57 dl/g.

Dry pellets of the obtained copolyester (PET4) having an intrinsic viscosity of 0.57 dl/g and dry pellets of polyamide (PA4) were blended at a blend ratio of PA4/PET4=20/80 (weight basis) in a tumbler.

The resultant mixture was molded into film from a twin-screw extruder (screw diameter: 20 mmφ; L/D: 25) by a T-die method under conditions of a cylinder temperature of 270 to 285° C., a T-die temperature of 280° C., a screw speed of 100 rpm and a cooling roll temperature of 70° C., thereby obtaining non-stretched sheet having a width of 120 mm and a thickness of about 0.3 mm. The haze value thereof is shown in Table 16.

After preheating at 90 to 105° C. for 30 seconds, the non-stretched sheet was stretched simultaneously in the machine and transverse directions at a linear stretching speed of 89%/sec and a stretch ratio of 4.0 times the original length in each direction using a biaxial stretching machine manufactured by Toyo Seiki Co., Ltd. Then, the biaxially stretched film was heat-treated at 235 to 240° C. for 5 seconds under tension, thereby obtaining stretched film having a thickness of 20 μm. The haze value and the oxygen permeability thereof are shown in Table 16.

EXAMPLE 39

Into a reaction vessel equipped with a stirring device, a partial condenser, a thermometer and nitrogen gas inlet, were charged 60.33 kg of dimethyl terephthalate, 34.88 kg of ethylene glycol and 23 g of manganese acetate. After sufficiently replacing the atmosphere with nitrogen gas, the contents of the reaction vessel were heated to 164° C. over 100 minutes with stirring under gentle nitrogen gas stream. The supply of nitrogen gas was stopped when methanol generated by ester interchange begun to be distilled, and then the temperature of reaction mixture was raised continuously from 164° C. to 212° C. over 250 minutes, thereby distilling off the generated methanol through the partial condenser and cooling condenser while preventing ethylene glycol from being distilled off. When the amount of distilled methanol reached 18.27 kg (corresponding to 91.3% reaction rate of the dicarboxylic acid component), 0.30 kg of trimellitic anhydride (dimethyl terephthalate: trimellitic anhydride=99.5: 0.5 by mol), 9 g of germanium oxide and 48 g of triphenyl phosphite were charged into the reaction vessel, thereby initiating polycondensation. After continuously raising the temperature of reaction mixture from 208° C. to 241° C. over 33 minutes, the temperature was continuously raised to 282° C. over 140 minutes while gradually reducing the inner pressure to 0.27 kPa, thereby distilling off ethylene glycol from the reaction system. After continuing the polycondensation accompanying the distillation of ethylene glycol for 28 minutes while maintaining the reaction mixture at 282° C. and the inner pressure at 0.27 kPa or lower, the resultant copolyester resin was taken out of the reaction vessel and pelletized. The intrinsic viscosity of the copolyester was 0.58 dl/g.

Dry pellets of the obtained copolyester (PET5) having an intrinsic viscosity of 0.58 dl/g and dry pellets of polyamide (PA4) were blended at a blend ratio of PA4/PET5=20/80 (weight basis) in a tumbler.

The resultant mixture was molded into film from a twin-screw extruder (screw diameter: 20 mmφ; L/D: 25) by a T-die method under conditions of a cylinder temperature of 270 to 285° C., a T-die temperature of 280° C., a screw speed of 100 rpm and a cooling roll temperature of 70° C., thereby obtaining non-stretched sheet having a width of 120 mm and a thickness of about 0.3 mm. The haze value thereof is shown in Table 16.

After preheating at 90 to 105° C. for 30 seconds, the non-stretched sheet was stretched simultaneously in the machine and transverse directions at a linear stretching speed of 89%/sec and a stretch ratio of 4.0 times the original length in each direction using a biaxial stretching machine manufactured by Toyo Seiki Co., Ltd. Then, the biaxially stretched film was heat-treated at 235 to 240° C. for 5 seconds under tension, thereby obtaining stretched film having a thickness of 20 μm. The haze value and the oxygen permeability thereof are shown in Table 16.

Comparative Example 19

Into a reaction vessel equipped with a stirring device, a partial condenser, a thermometer and nitrogen gas inlet, were charged 60.63 kg of dimethyl terephthalate, 34.88 kg of ethylene glycol and 23 g of manganese acetate. After sufficiently replacing the atmosphere with nitrogen gas, the contents of the reaction vessel were heated to 160° C. over 110 minutes with stirring under gentle nitrogen gas stream. The supply of nitrogen gas was stopped when methanol generated by ester interchange begun to be distilled, and then the temperature of reaction mixture was raised continuously from 160° C. to 214° C. over 250 minutes, thereby distilling off the generated methanol through the partial condenser and cooling condenser while preventing ethylene glycol from being distilled off. When the amount of distilled methanol reached 18.83 kg (corresponding to 94.1% reaction rate of the dicarboxylic acid component), 9 g of germanium oxide and 48 g of triphenyl phosphite were charged into the reaction vessel, thereby initiating polycondensation. After continuously raising the temperature of reaction mixture from 214° C. to 243° C. over 33 minutes, the temperature was continuously raised to 282° C. over 139 minutes while gradually reducing the inner pressure to 0.27 kPa, thereby distilling off ethylene glycol from the reaction system. After continuing the polycondensation accompanying the distillation of ethylene glycol for 80 minutes while maintaining the reaction mixture at 282° C. and the inner pressure at 0.27 kPa or lower, the resultant polyester resin was taken out of the reaction vessel and pelletized. The intrinsic viscosity of the polyester was 0.60 dl/g.

Dry pellets of the obtained polyester (PET6) having an intrinsic viscosity of 0.60 dl/g and dry pellets of polyamide (PA4) were blended at a blend ratio of PA4/PET6=20/80 (weight basis) in a tumbler.

The resultant mixture was molded into film from a twin-screw extruder (screw diameter: 20 mmφ; L/D: 25) by a T-die method under conditions of a cylinder temperature of 270 to 285° C., a T-die temperature of 280° C., a screw speed of 100 rpm and a cooling roll temperature of 70° C., thereby obtaining non-stretched sheet having a width of 120 mm and a thickness of about 0.3 mm. The haze value thereof is shown in Table 16.

After preheating at 90 to 105° C. for 30 seconds, the non-stretched sheet was stretched simultaneously in the machine and transverse directions at a linear stretching speed of 89%/sec and a stretch ratio of 4.0 times the original length in each direction using a biaxial stretching machine manufactured by Toyo Seiki Co., Ltd. Then, the biaxially stretched film was heat-treated at 235 to 240° C. for 5 seconds under tension, thereby obtaining stretched film having a thickness of 20 μm. The haze value and the oxygen permeability thereof are shown in Table 16.

TABLE 16

|  | Ex. 38 | Ex. 39 | Com. Ex. 19 |
|---|---|---|---|
| Resin Composition (wt. part) |  |  |  |
| Polyamide: PA4 | 20 | 20 | 20 |
| Copolyester: PET4 | 80 | — | — |
| Copolyester: PET5 | — | 80 | — |
| Polyester: PET6 | — | — | 80 |
| Tricarboxylic acid compound |  |  |  |
| Kind | TMA | TMA | — |
| Acid component (molar ratio) |  |  |  |
| Dicarboxylic acid | 99.7 | 99.5 | 100 |
| Tricarboxylic acid compound | 0.3 | 0.5 | 0 |
| Evaluation results |  |  |  |
| Haze of non-stretched sheet (%)[b] |  |  |  |
| Ordinary conditioning | 11.2 | 10.7 | 19.7 |
| High-humidity storage | 20.4 | 15.9 | 57.3 |
| Haze of stretched film (%) | 7.4 | 7.8 | 9.9 |
| Oxygen permeability[c] | 0.27 | 0.27 | 0.28 |

[b] and [c]: Same as noted above.

What is claimed is:

1. A polyester resin composition produced by melt-kneading:

100 parts by weight of a mixture comprising (a) 5 to 50% by weight of a polyamide resin produced by polymerization of a diamine component containing 70 mol % or more of m-xylylenediamine and a dicarboxylic acid component containing 70 mol % or more of adipic acid, wherein said polyamide resin has a relative viscosity of 2.02 to 4.20 when measured at 25° C. with respect to a solution of one gram of said polyamide resin in 100 ml of 96% sulfuric acid, and (b) 95 to 50% by weight of a polyester resin produced by polymerization of a dicarboxylic acid component containing 70 mol % or more of an aromatic dicarboxylic acid and a diol component containing 70 mol % or more of an aliphatic diol; and 0.01 to 2 parts by weight of a tricarboxylic acid compound.

2. The polyester resin composition according to claim 1, which is produced by first melt-kneading said polyester resin with said tricarboxylic acid compound to obtain a mixture, and then melt-kneading the mixture with said polyamide resin.

3. The polyester resin composition according to claim 1, which is produced by first melt-kneading said polyamide resin with said tricarboxylic acid compound to obtain a mixture, and then melt-kneading the mixture with said polyester resin.

4. The polyester resin composition according to claim 1, wherein said polyamide resin is a solid phase-polymerized polyamide satisfying the following formula (2):

$$2.30 \leq \text{relative viscosity} \leq 4.20 \quad (2)$$

produced by solid phase polymerization of a melt-polymerized polyamide satisfying the following formula (1):

$$1.83 \leq \text{relative viscosity} \leq 2.28 \quad (1),$$

said melt-polymerized polyamide being produced by melt polycondensation of said diamine component and said dicarboxylic acid component.

5. The polyester resin composition according to claim 1, wherein said polyester resin is at least one resin selected from the group consisting of polyethylene terephthalate resin and ethylene terephthalate-isophthalate copolymer resin.

6. The polyester resin composition according to claim 1, wherein said polyamide resin is poly(m-xylylenediadipamide).

7. The polyester resin composition according to claim 1, wherein said tricarboxylic acid compound is selected from the group consisting of aromatic tricarboxylic acids and anhydrides thereof.

8. The polyester resin composition according to claim 1, wherein said tricarboxylic acid compound is trimellitic anhydride.

9. The polyester resin composition according to claim 1, wherein the polyamide resin has a moisture content of at most 0.15%.

10. The polyester resin composition according to claim 1, wherein the composition includes 0.05 to 1.5 parts by weight of the tricarboxylic acid compound.

11. The polyester resin composition according to claim 1, wherein the composition includes 0.1 to 1 part by weight of the tricarboxylic acid compound.

12. The polyester resin composition according to claim 1, wherein said mixture includes 5 to 45% by weight of the polyamide resin.

13. The polyester resin composition according to claim 1, wherein the mixture includes 5 to 40% by weight of the polyamide resin.

14. A molded article produced by molding a polyester resin composition according to claim 1, said molded article being selected from the group consisting of films, sheets and thin-wall hollow containers.

15. A polyester resin composition produced by melt-kneading:

95 to 50% by weight of a copolyester resin produced by polymerization of an acid component and a diol component, said acid component comprising (A) 99.99 to 98.0 mol % of a dicarboxylic acid component containing 70 mol % or more of an aromatic dicarboxylic acid and (B) 0.01 to 2 mol % of a tricarboxylic acid compound, and said diol component comprising 70 mol % or more of an aliphatic diol; and 5 to 50% by weight of a polyamide resin produced by polymerization of a diamine component containing 70 mol % or more of m-xylylenediamine and a dicarboxylic acid component containing 70 mol % or more of adipic acid, wherein said polyamide resin has a relative viscosity of 2.02 to 4.20 when measured at 25° C. with respect to a solution of one gram of said polyamide resin in 100 mol of 96% sulfuric acid.

16. The polyester resin composition according to claim 15, wherein said polyamide resin is a solid phase-polymerized polyamide satisfying the following formula (2):

$$2.30 \leq \text{relative viscosity} \leq 4.20 \qquad (2)$$

produced by solid phase polymerization of a melt-polymerized polyamide satisfying the following formula (1):

$$1.83 \leq \text{relative viscosity} \leq 2.28 \qquad (1),$$

said melt-polymerized polyamide being produced by melt polycondensation of said diamine component and said dicarboxylic acid component.

17. The polyester resin composition according to claim 15, wherein said polyester resin is at least one resin selected from the group consisting of polyethylene terephthalate resin and ethylene terephthalate-isophthalate copolymer resin.

18. The polyester resin composition according to claim 15, wherein said polyamide resin is poly(m-xylylenediadipamide).

19. The polyester resin composition according to claim 15, wherein said tricarboxylic acid compound is selected from the group consisting of aromatic tricarboxylic acids and anhydrides thereof.

20. The polyester resin composition according to claim 15, wherein said tricarboxylic acid compound trimellitic anhydride.

21. The polyester resin composition according to claim 15, wherein the polyamide resin is included in the polyester resin composition in an amount of 5 to 45% by weight based on the total weight of the polyester resin composition.

22. The polyester resin composition according to claim 15, wherein the polyamide resin is included in the polyester resin composition in an amount of 5 to 40% by weight based on the total weight of the polyester resin composition.

23. A molded article produced by molding a polyester resin composition according to claim 15, said molded article being selected from the group consisting of films, sheets and thin-wall hollow containers.

* * * * *